(12) United States Patent
Cadden

(10) Patent No.: US 6,460,872 B2
(45) Date of Patent: Oct. 8, 2002

(54) VEHICLE SUSPENSION SYSTEMS

(75) Inventor: Robert Leslie Cadden, Tyabb (AU)

(73) Assignee: The Boler Company., Itasca, IL (US)

( * ) Notice: Subject to any disclaimer, the term of this patent is extended or adjusted under 35 U.S.C. 154(b) by 0 days.

(21) Appl. No.: 09/814,502

(22) Filed: Mar. 22, 2001

(65) Prior Publication Data

US 2001/0011803 A1 Aug. 9, 2001

Related U.S. Application Data

(63) Continuation of application No. 09/145,472, filed on Sep. 2, 1998, now Pat. No. 6,224,074.

(30) Foreign Application Priority Data

Sep. 4, 1997 (AU) .............................................. PO8983

(51) Int. Cl.[7] ................................................ B60G 5/02
(52) U.S. Cl. ................. 280/678; 280/683; 280/124.116
(58) Field of Search ............................... 280/677, 678, 280/683, 681, 685, 687, 124.116

(56) References Cited

U.S. PATENT DOCUMENTS

| | | | |
|---|---|---|---|
| 3,162,465 A | * 12/1964 | Vaugoyeau | ................. 280/678 |
| 3,215,384 A | * 11/1965 | Chambers | ................... 280/683 |
| 3,458,213 A | 7/1969 | Chaney | |
| 3,510,149 A | 5/1970 | Raidel | |
| 3,698,737 A | * 10/1972 | Grant | ................... 280/124.109 |
| 3,883,125 A | 5/1975 | Takatsu | |
| 4,310,171 A | * 1/1982 | Merkle | ................ 280/124.116 |
| 4,699,399 A | 10/1987 | Jable et al. | |
| 4,762,337 A | 8/1988 | Raidel | |
| 5,016,906 A | 5/1991 | Cadden | |
| 5,228,718 A | * 7/1993 | Kooistra | ..................... 280/678 |
| 5,447,324 A | 9/1995 | Raidel, Sr. | |
| 6,224,074 B1 | 5/2001 | Cadden | |

* cited by examiner

Primary Examiner—Peter C. English
(74) Attorney, Agent, or Firm—Cook, Alex, McFarron, Manzo, Cummings & Mehler, Ltd.

(57) ABSTRACT

The invention relates to a suspension system for installation between a chassis and dual axles of a vehicle. The suspension system includes an equalizer beam pivotally linking the axles together. A trailing arm support member is pivotally attached to a hanger bracket on the chassis. A suspension saddle is secured to the trailing arm support member to provide pivotal support for an equalizer beam. Air springs are located between the chassis and the trailing arm support member.

7 Claims, 7 Drawing Sheets

VEHICLE SUSPENSION SYSTEMS

CROSS-REFERENCE TO RELATED APPLICATIONS

This is a continuation of U.S. Ser. No. 09/145,472, filed Sep. 2, 1998, U.S. Pat. No. 6,224,074.

BACKGROUND OF THE INVENTION

The invention relates to vehicle suspension systems for dual axle vehicles in which the axles are attached to equaliser beams or more commonly known as walking beams, so that the vehicle load is transferred to the road surface either equally, or in proportion, to the position of the beam pivot to the beam centre.

Various vehicle suspensions have been developed for dual axle vehicles in which the axles are attached to walking beams with a springing medium located between the beam pivot and the vehicle chassis to absorb shocks caused by uneven road conditions. Additionally a mechanical connection system is used between the walking beam and the chassis to firstly transmit tractive effort and torque; secondly to absorb braking effort and torque; and thirdly to constrain the lateral relationship of the axles with the chassis. In the case where the springing mechanism uses steel springs, the spring is usually a multi-leaf semi elliptical type or a taper leaf type, having an eye at the forward end and a slipper surface at the rear end. The spring and its associated saddle then performs all or part all of the required functions of the mechanical connection system. In the case where the springing mechanism uses rubber springs, or air springs, the mechanical connection systems are usually vertical drive pins and load cushions located in vertical aligned rubber bushings.

Air suspensions are generally recognised as having desirable features including superior ride comfort for the driver; enhanced impact protection for the vehicle and cargo; and reduced road impact and consequent road wear. Air suspension with walking beams and vertical drive pins have the benefits of previously mentioned desirable features reduced because the vertical drive pins and associated bushings tend to restrict vertical freedom of the suspension.

BRIEF SUMMARY OF THE INVENTION

It is an object of the invention to provide a suspension system which combines the advantages of both a walking beam suspension which incorporates air spring(s).

A further object of the invention is to provide a suspension system which provides a simple way of converting an existing walking beam suspension from mechanical springing to air springing.

With these objects in view the present invention in a first aspect provides a suspension system for installation between a chassis and dual axles of a vehicle, said suspension system including an equaliser beam pivotally linking said axles together, a trailing arm support member pivotally attached to a hanger bracket on said chassis, a suspension saddle secured to said trailing arm support to provide pivotal support for said equaliser beam and air spring means located between said chassis and said trailing arm support member.

Preferably said trailing arm support member is formed from a steel fabrication, a nodular iron casting or a spring steel. In a preferred embodiment said suspension saddle is located below said trailing support member and said air spring means is located on the opposing side of said trailing support member. In a practical embodiment the pivotal attachment of said trailing arm support member to said hanger bracket includes a releasable offset cam member to provide axle alignment adjustment.

In a further aspect of the invention there is provided an axle adjustment system for vehicle suspension, said axle adjustment system including a hanger bracket for attachment to the chassis of said vehicle, a suspension element pivotally attached to said hanger bracket, a pivot pin releasably located within said hanger bracket and having a cam element for engagement with said suspension element whereby rotation of said pivot pin causes relative movement between said suspension element and said hanger bracket.

In order that the invention may be clearly understood there shall now be described by way of a non-limitative examples only preferred constructions of the invention incorporating the principal features of the present invention. The description is with reference to the accompanying illustrated drawings in which:

DETAILED DESCRIPTION OF THE INVENTION

Figure 1:
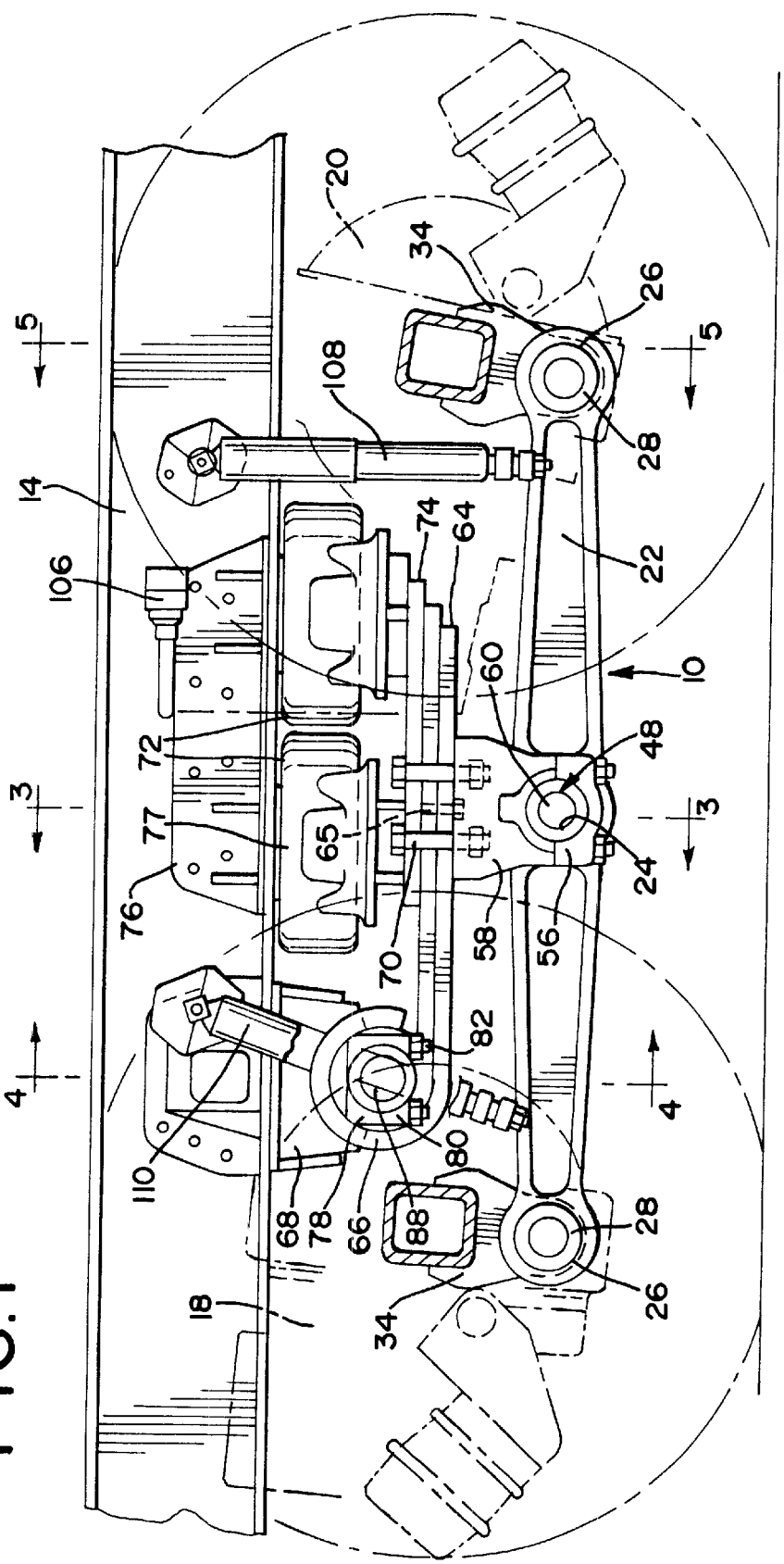
FIG. 1 is a side view of a first embodiment of a vehicle suspension made in accordance with the invention.

For illustrative purposes, the suspension systems 10,12 in FIGS. 1 to 5 and FIG. 6 respectively are shown installed on a tandem axle vehicle. To avoid duplication of description identical reference numerals will be used for identical components in both embodiments. Since each suspension in the systems is identical to the other, only one need be described. The vehicle is the kind having a left side rail frame member 14, a right side rail frame member 16, a forward axle 18 and a trailing axle 20. It will be understood that the suspensions illustrated for the left side of the vehicle is duplicated with the same kind of suspension on the right side of the vehicle.

An equaliser beam 22 (also known as a walking beam) is formed as a steel or nodular iron casting, a steel or aluminium alloy forging or a steel fabrication. The beam 22 has a pivot centre hole 24 and pivot bushing shells 26. Each bushing shell 26 includes a beam end bush 28 which incorporates a compliant rubber element 30 and a steel centre 32 that provides for attachment to axles 18,20 through an axle bracket 34. An adjustment method for axle alignment is provided by adjustment shims 36. The use of such shims are well known in the art. In the inset shown as "A" in FIG. 2 and in FIG. 5 an alternate beam end bush design is shown that does not incorporate the axle alignment feature of shims 36. This alternative uses an adaptor assembly 38 for attachment to the axles 18,20 via axle brackets 34. Assembly 38 includes a support sleeve 40, end plugs 42, threaded fastener 44 and nut 46.

Located in pivot centre hole 24 is a pivot bush 48 which allows for articulation of axles 18,20 and also transfers the vertical force from the vehicle weight and horizontal forces of tractive effort and braking, through to wheels, tires and the ground surface. Pivot bush 48 usually has a steel inner sleeve 50, compliant rubber element 52 and an steel outer sleeve 54. The outer sleeve 54 is a press fit in the pivot centre hole 24 and the inner sleeve 50 extends at each end to accept a respective clamp 56 to locate the pivot bush 48 and beam 22 assembly in a suspension saddle 58. If desired, a lubricatable bronze bushing arrangement could be used to replace the steel and rubber bush 48. A tubular steel cross tube 60 fits into each of the inner sleeves 50 to maintain alignment of one beam relative to the other. One cross tube 60 is used per vehicle.

Suspension saddle 58 is made as a steel or nodular iron casting or alternatively can be a welded steel fabrication. Lugs 62 are an optional item for this type of saddle and are used as a location face for a trailing arm support member 64 in the form of a spring member which fits on to the saddle 58. Two saddles 58 are used per suspension, one each side of the vehicle. Spring member 64 is the main support member which acts as a beam member. Spring member 64 can be constructed as a leaf spring assembly with from one to several leaves (as shown). To hold the leaves together a bolt 65 and nut 67 are used. An eye 66 of spring member 64 is pivoted at the front end to a frame hanger bracket 68 fixed to frame member 14. Spring member 64 is clamped to the suspension saddle 58 with bolts 70 at approximately a centre position and has air springs 72 mounted between the centre and the rear of spring member 64. Two spring members 64 are used per suspension, one each side of the vehicle.

An adaptor plate 74 is mounted on top of spring member 64 and acts to support the air springs 72. Each air spring 72 has a mounting bracket 76 to allow attachment to frame members 14,16. Bracket 76 is secured to the top plate 77 of air spring 72 with top plate 77 abutting a respective one of frame members 14,16. In a further embodiment saddle 58, spring member 64 and adaptor plate 74 can be manufactured in one piece. This can be in the form of a steel, aluminium alloy or nodular iron casting, or as a welded steel fabrication. The air springs 72 can be the industry standard sleeves, rolling lobes or convoluted types. In the embodiment shown in FIGS. 1 to 5 two air springs 72 are shown per side. In the embodiment shown in FIG. 6 only two air springs 72 are used ie one each side of the vehicle. The number of air springs 72 used can vary to suit requirements. The air spring(s) 72 of each side are connected in series to equalise the pressure. Alternately, it is possible to isolate the air springs on the right side from those on the left side as an aid to roll stability.

Hanger bracket 68 is manufactured as a steel or nodular iron or aluminium alloy casting or a steel fabrication. The lower part 78 of hanger bracket 68 is the upper half of a split cap arrangement, designed to locate, house and restrain a suspension pivot pin 88. Pivot pin 88 may be cylindrical and provide no suspension adjustment or be shaped as shown to provide adjustment. Clamps 80 form the lower half of the split cap arrangement secured by threaded studs 82 which are screwed into hanger bracket 68. Washers 86 and nuts 84 hold clamps 80 in position. An alternative arrangement to this would be the use of a bolt passing through clamps 80 to be threaded directly into hanger bracket 68.

In the embodiment shown pivot pin 88 allows adjustment of axle alignment. A pivot bush 90 is an interference fit in eye 66 of spring member 64. Pivot pin 88 includes a an eccentric element 92 which is located between support pins 94 and offset therefrom to provide a cam member. Eccentric element 92 is located within pivot bush 90 and can rotate therein. Support pins 94 are clamped by the split cap functions of lower part 78 of hanger bracket 68 and clamps 80. A square hole 96 is designed to accept the square bar of a wrench or turning bar (not shown) so that the eccentric element 92 can be rotated about the diametral axis of support pins 94, inside the split cap housing (when loosened). This rotation moves the diametral axis of eccentric element 92 which in turn moves the spring member 64 of the suspension to provide the adjustment. Square hole 96 may be incorporated into an insert or could alternatively be any polygonal hole, the criteria being that a key arrangement inserted into the hole can transmit torque to eccentric element so that it can be rotated, when the nuts 84 of the split cap are loosened. This adjustment system is not restricted to this embodiment as it can be readily incorporated in any spring, trailing arm or other axle attachment arrangement for suspension. Vehicle suspensions benefit from having an alignment adjustment system to allow wheels and tires to be aligned, relative to the vehicle direction of travel, to provide for optimum tire life.

Figure 2:
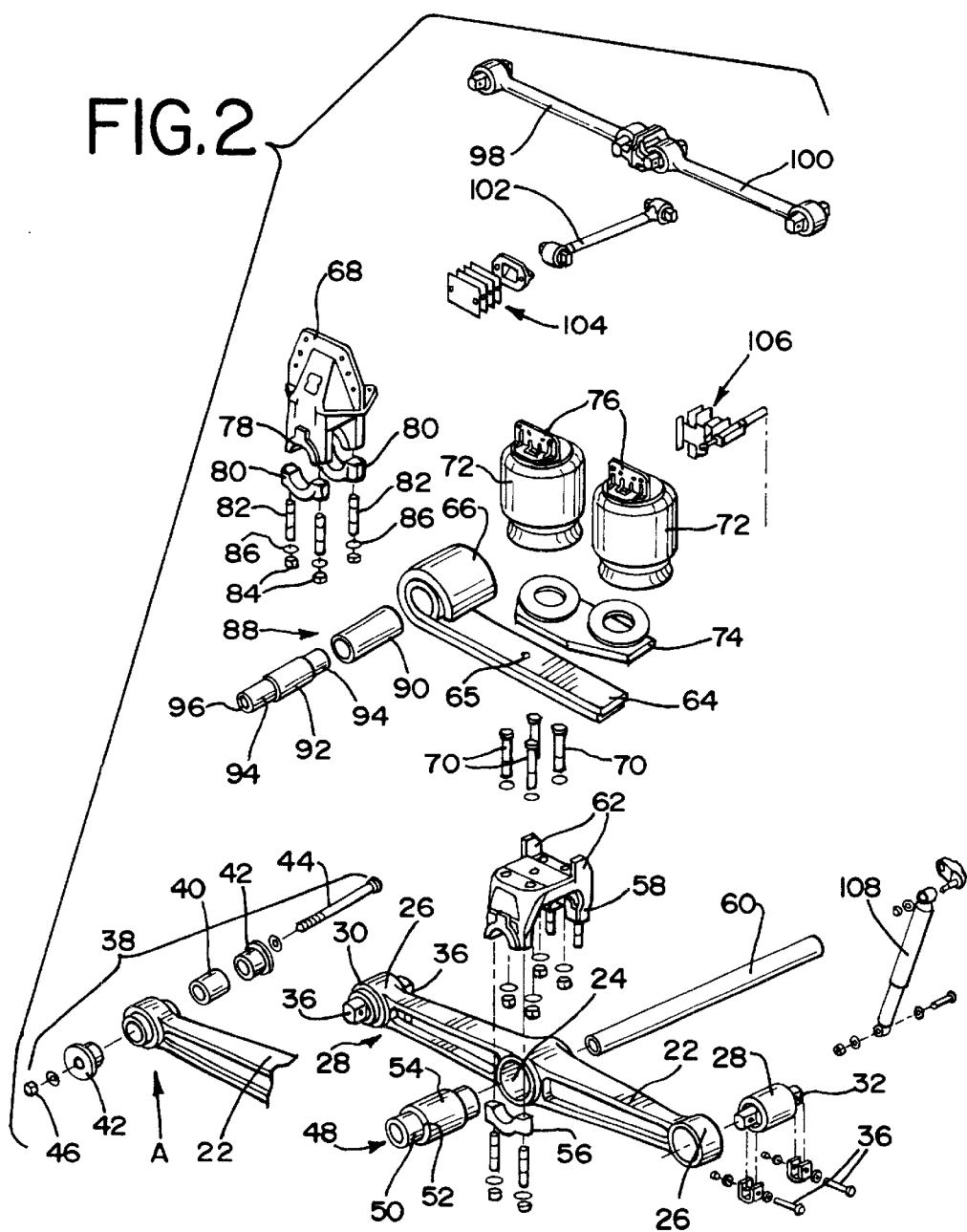
FIG. 2 is an exploded perspective view of the components of the vehicle suspension shown in FIG. 1.
Figure 3:
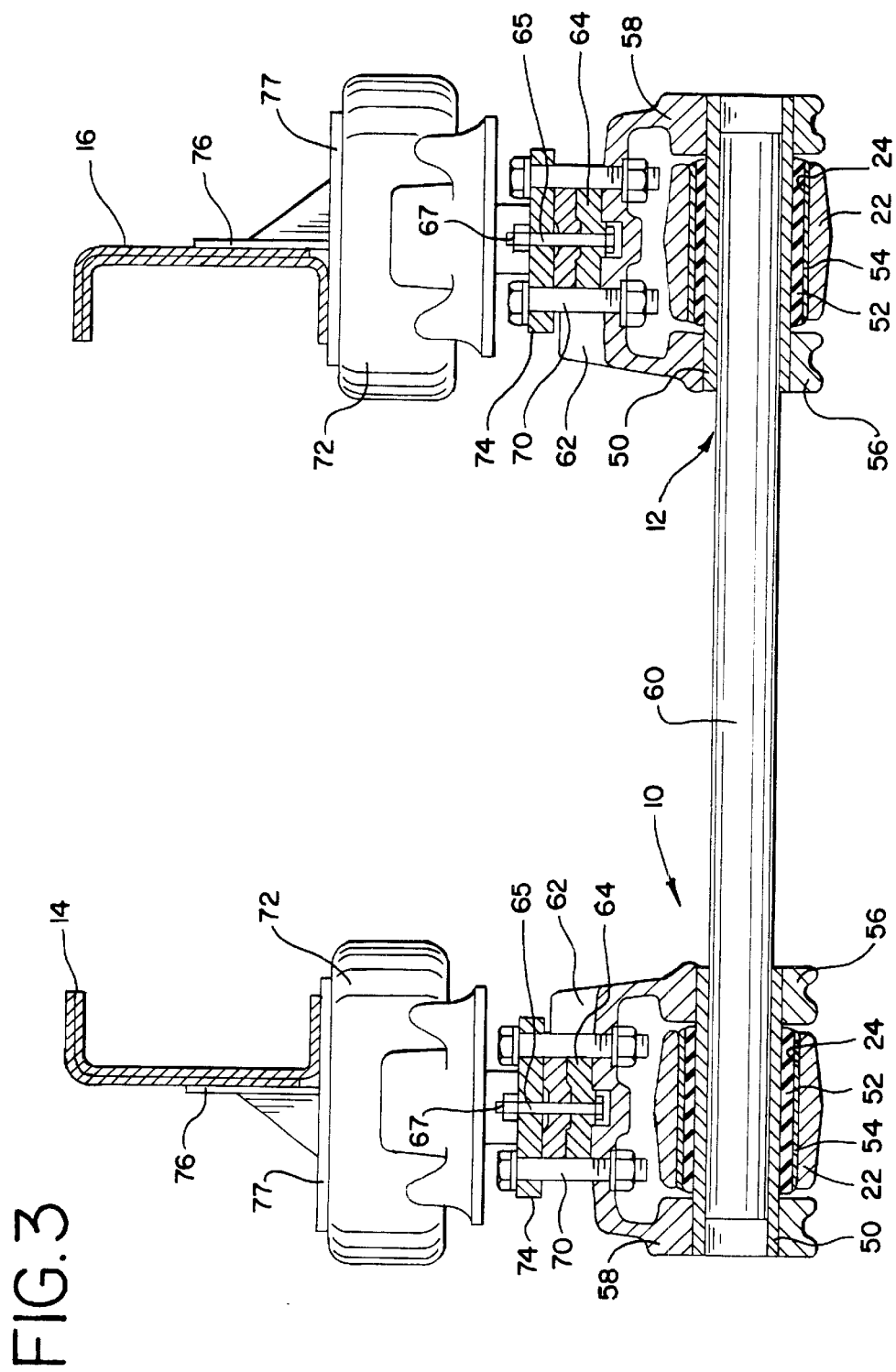
FIG. 3 is a cross-sectional view along and in the direction of arrows 3—3 shown in FIG. 1.
Figure 4:
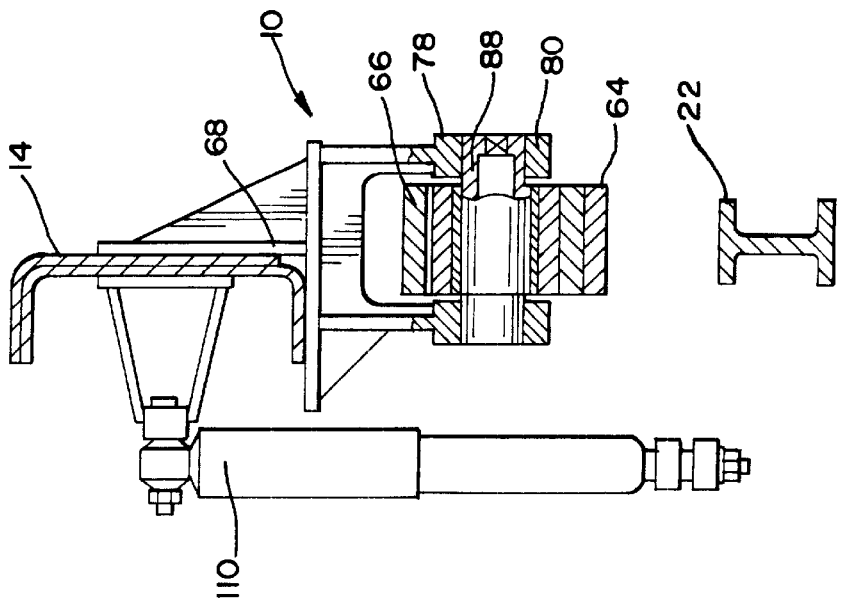
FIG. 4 is a cross-sectional view along and in the direction of arrows 4—4 shown in FIG. 1.
Figure 4:
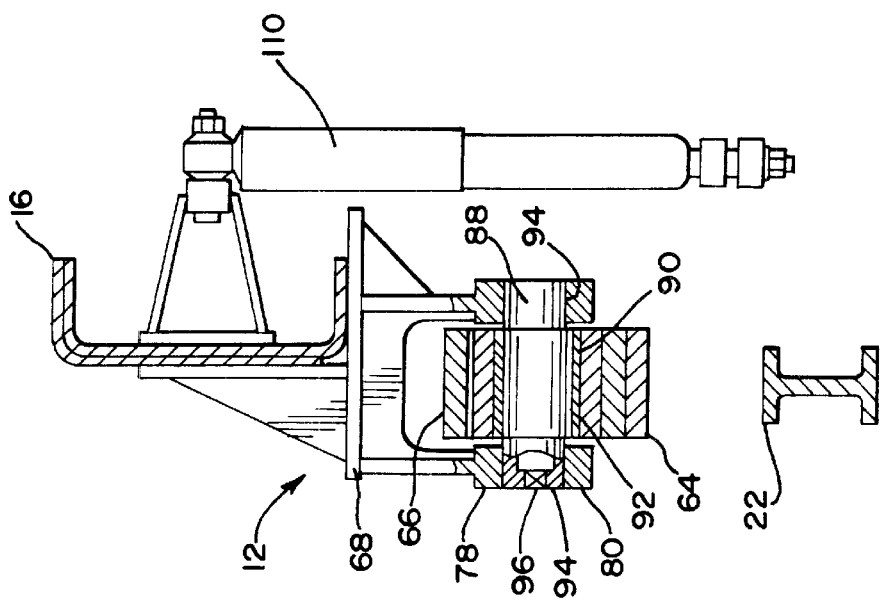
Figure 5:
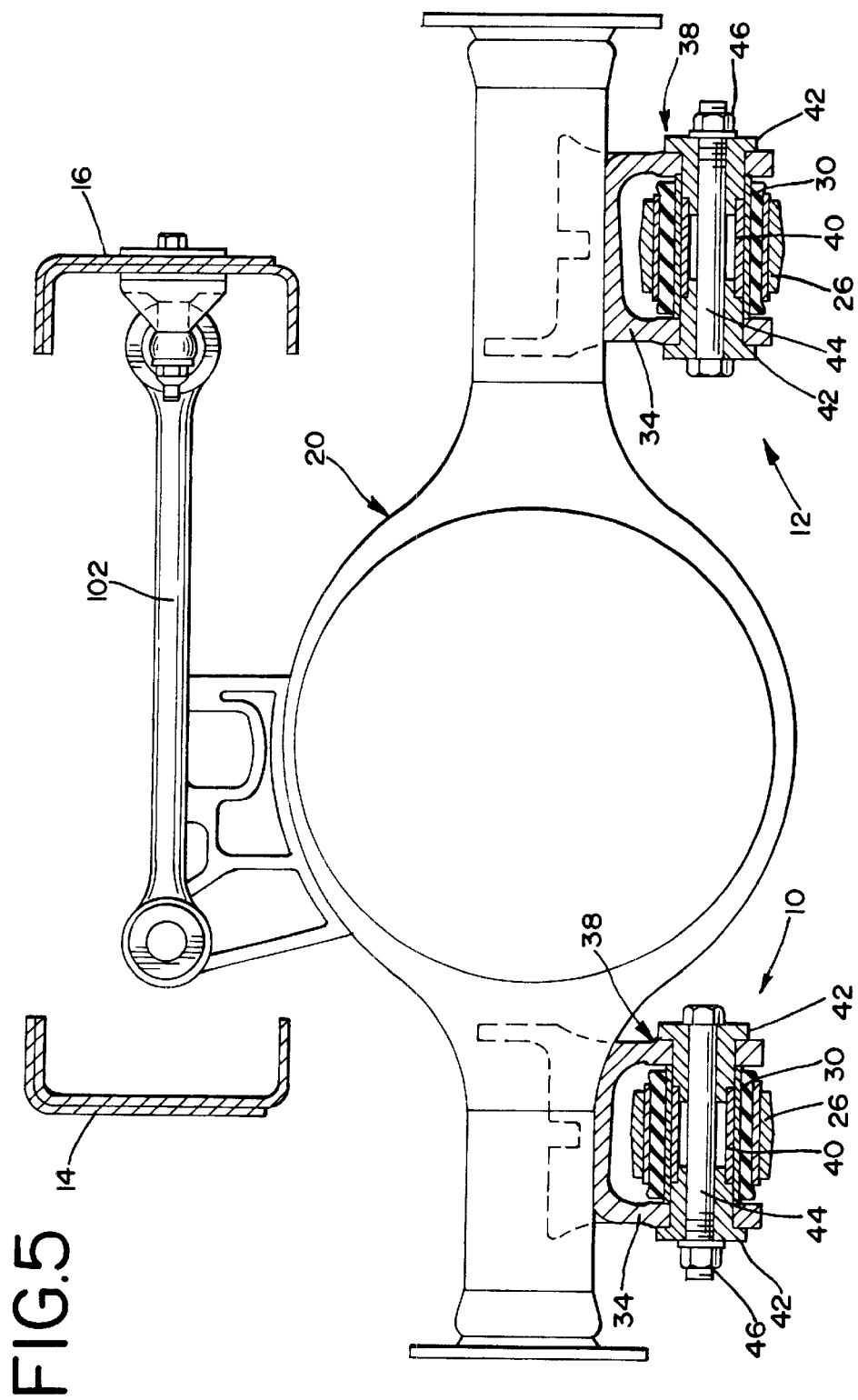
FIG. 5 is a cross-sectional view along and in the direction of arrows 5—5 shown in FIG. 1.
Figure 6:
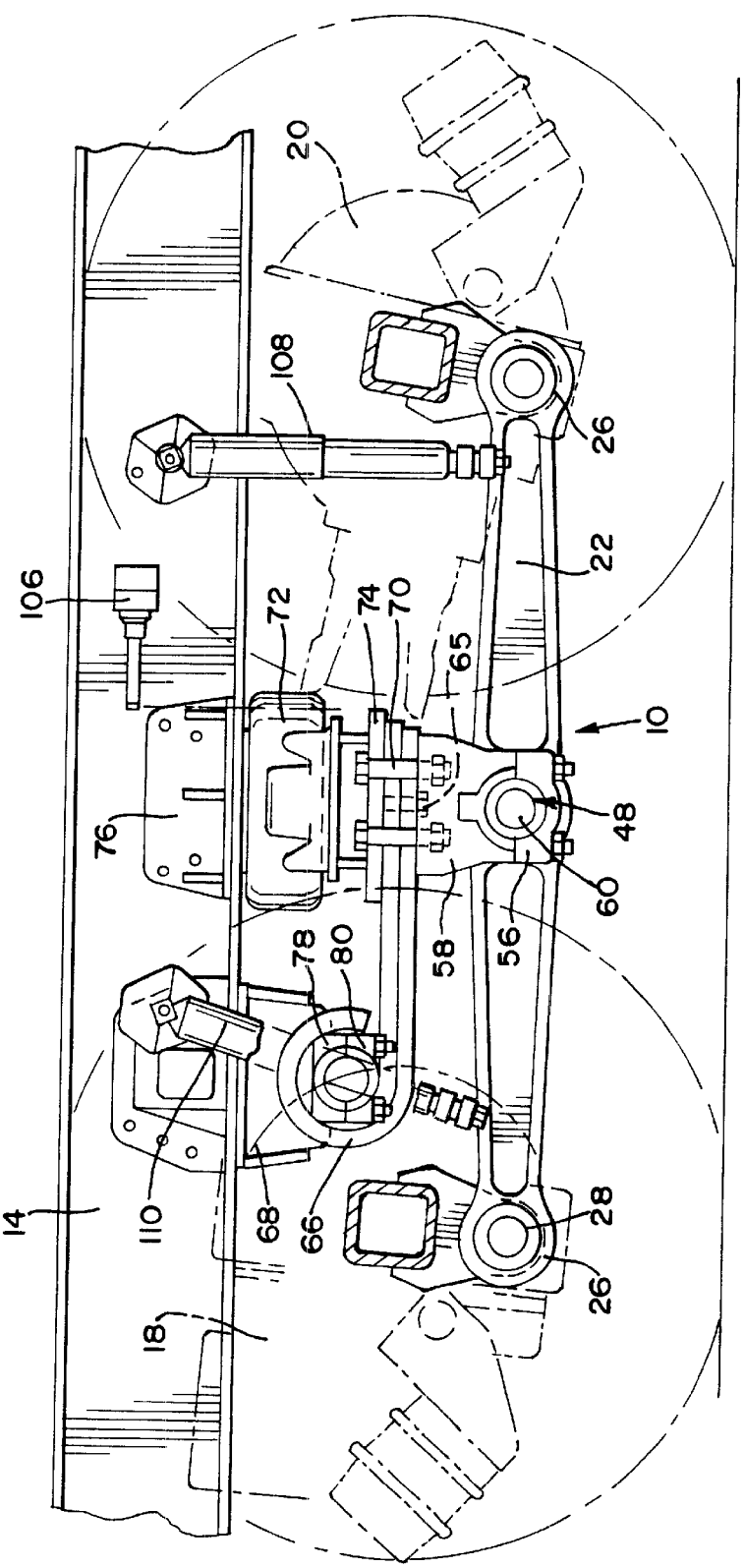
FIG. 6 is a side view of a second embodiment of a vehicle suspension made in accordance with the invention.

A longitudinal torque rod or linkage 98 will control driving and braking torque of the forward driven (or non driven) axle 18. One forward longitudinal torque rod 98 would be used per suspension. A further longitudinal torque rod or linkage 100 controls driving and braking torque of the rearmost drive (or non driven) axle 20. A transverse rod 102 (sometimes referred to as a Panhard rod) controls lateral movement of the axles 18,20 relative to the chassis. Two transverse rods 102 are used per suspension, one for each of the two axles. A spacer and shim pack 104 provides lateral alignment adjustment of transverse rods 102, if required. In an alternate design an "A"-frame arrangement or "V"-rod can be substituted for the two longitudinal torque rods 98,100 and the two transverse rods 102. A height control valve 106 is used to maintain a constant ride height for the suspension. Normally the suspension will use a single height control valve 106 but an alternative may use two valves as an aid to roll stability. Two valves would normally be used, one each side, when the left and right air springs are isolated from each other. A hydraulic shock absorber (damper) 108 provides hydraulic control of suspension movement. The suspension will normally have 4 shock absorbers 108,110 per suspension, ie two per axle (as shown in FIG. 1) but an alternative would be for two shock absorbers 108 (as shown in FIG. 2) fitted to rear axle 108 only.

Figure 7:
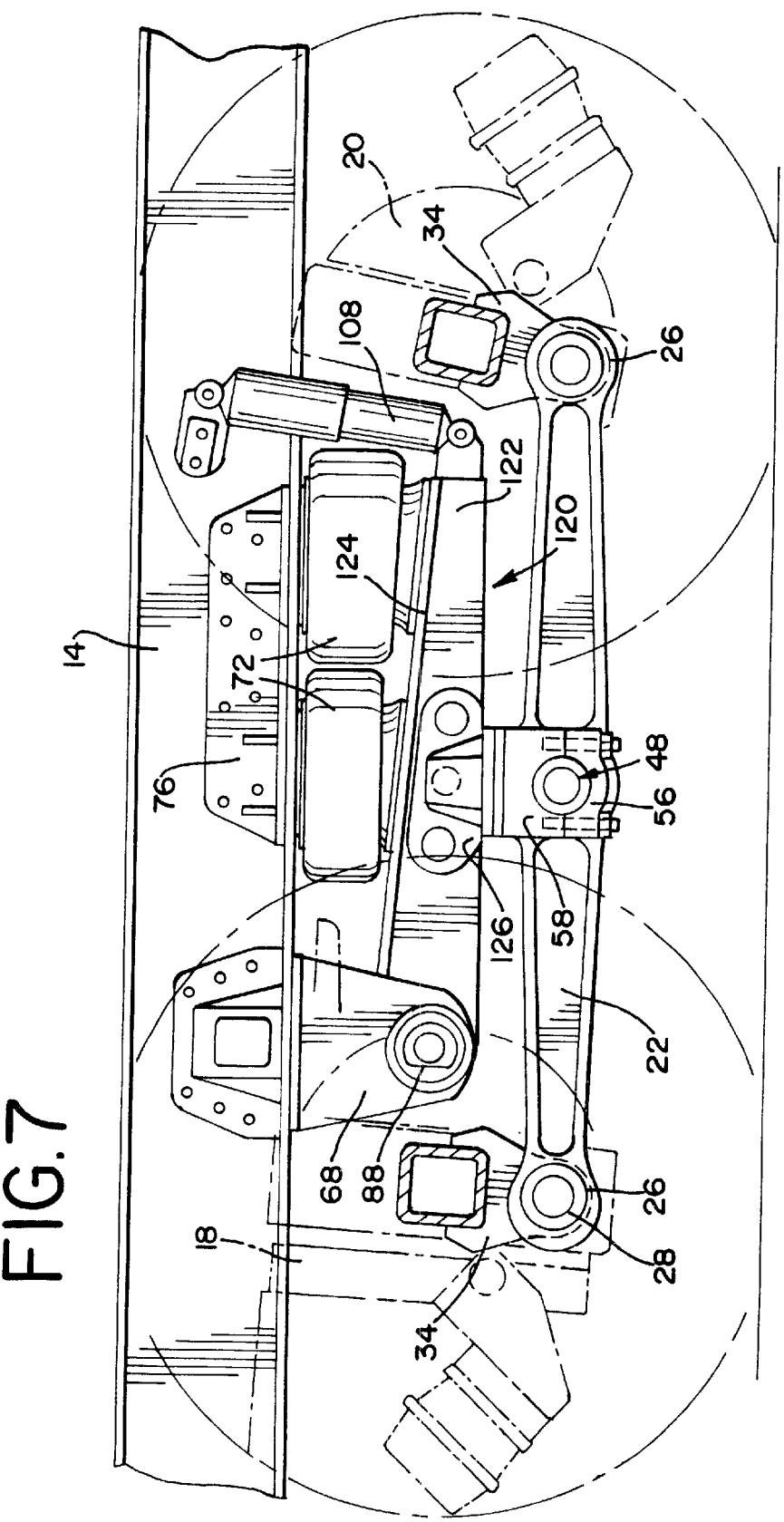
FIG. 7 is a similar view to that of FIG. 1 of the third embodiment of a vehicle suspension made in accordance with the invention.

In FIG. 7 there is shown a further embodiment where the same reference numerals have been used to avoid duplication of description. In this embodiment trailing arm support 64 (FIG. 1) is in the form of a steel fabrication 120. It may also be formed as a nodular iron casting. Fabrication 120 is T-shaped in cross-section and has suspension saddle(s) 126 secured thereto. The horizontal arm 124 of fabrication 120 has the air springs 72 secured thereto. Shock absorber 108 is coupled to the free end 122 of trailing arm support 120 and to frame member 14.

The invention can also be used to convert existing suspensions to the new type of suspension. Examples of suspensions that can be converted are the following Hendrickson model series: AR series, R series, RT/RT2 series, RTE/RTE2 series, RU series, RUE series, U/U2 series, UE/UE2 series, RS series, SR series and VS series.

Whilst there has been described in the foregoing description preferred constructions of a suspension system incorporating certain features of the present invention, it will be understood by those skilled in the technology concerned that many variations or modifications and details of design or construction may be made without departing from the essential features of the present invention.

What is claimed is:

1. A vehicle suspension system for a vehicle having a longitudinally extending chassis, a first laterally extending axle and a second laterally extending axle, comprising:
   a hanger bracket attached to the chassis;
   a longitudinally extending trailing arm support member pivotally attached to the hanger bracket, said longitudinally extending trailing arm support member having a T-shaped cross-section;
   an air spring located between the trailing arm support member and the chassis;
   a longitudinally extending equalizer beam pivotally linking the first and second laterally extending axles together; and
   a suspension saddle secured to the trailing arm support member and pivotally supporting the equalizer beam.

2. The vehicle suspension as defined by claim 1 further comprising an additional air spring located between the trailing arm support member and the chassis.

3. The vehicle suspension as defined by claim 1 wherein the trailing arm support member is in the form of a steel fabrication.

4. The vehicle suspension as defined by claim 1 wherein the trailing arm support member includes a horizontal arm, and the air spring being secured to the horizontal arm of the trailing arm support member.

5. The vehicle suspension as defined by claim 1 wherein the trailing arm support member includes a first end and a second end, and further wherein the trailing arm support member is pivotally attached to the hanger bracket at its said first end, and further wherein the second end is a trailing end.

6. The vehicle suspension as defined by claim 1 further comprising a shock absorber linking the second end of the trailing arm support member to the chassis.

7. The vehicle suspension as defined by claim 1 wherein the trailing arm support member is in the form of a nodular iron casting.

* * * * *